United States Patent
Yim

(10) Patent No.: US 6,233,502 B1
(45) Date of Patent: May 15, 2001

(54) FAULT TOLERANT CONNECTION SYSTEM FOR TRANSIENTLY CONNECTABLE MODULAR ELEMENTS

(75) Inventor: Mark H. Yim, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/173,969

(22) Filed: Oct. 16, 1998

(51) Int. Cl.[7] .................................................. G06F 19/00
(52) U.S. Cl. ............................ 700/245; 700/86; 700/189; 345/352; 345/427; 52/250; 52/259; 336/225; 336/227; 403/169; 403/170; 403/171; 403/172; 403/173; 403/174; 403/176
(58) Field of Search ............................. 700/245, 86, 189; 345/352, 145, 133, 12, 427; 52/250, 259, DIG. 10; 156/DIG. 3; 336/227, 225; 171/170, 171; 403/169, 176, 171, 172, 170, 173, 174

(56) References Cited

U.S. PATENT DOCUMENTS

| | | | |
|---|---|---|---|
| 4,785,399 | * 11/1988 | Evans et al. | 345/352 |
| 5,103,403 | * 4/1992 | Ch'Hayder et al. | 395/98 |
| 5,523,662 | * 6/1996 | Goldenberg et al. | 318/568.11 |
| 5,662,587 | * 9/1997 | Grundfest et al. | 600/114 |
| 5,784,542 | * 7/1998 | Ohm et al. | 395/112 |
| 6,084,373 | * 7/2000 | Goldenberg et al. | 318/568.11 |
| 6,088,017 | * 7/2000 | Tremblay et al. | 345/156 |

OTHER PUBLICATIONS

Gregory et al., Kinematics of a metamorphic robotic system G.S. Robotics and Automation, Proceedings., IEEE International Confere, 1994.*

Abidi et al., A multisensor robotic module interchange system for space maintenance Southeastcon Proceedings. Energy and Information, 1989.*

* cited by examiner

Primary Examiner—William A. Cuchlinski, Jr.
Assistant Examiner—McDieunel Marc
(74) Attorney, Agent, or Firm—Robert A. Burtalaff; David E. Henn

(57) ABSTRACT

A system and method for transiently connecting modular elements of a self movable robot. The self movable robot is known as metamorphosing robots, polymorphic robots, shape changing robots, or morphable structures. The modular elements can act together to build a structure to perform a given task. Each modular robotic module contains a mechanism allowing for communication and transfer of power between adjacent modules, and defining a robot whole to be all the modules in one connected component.

10 Claims, 11 Drawing Sheets

FIG. 4
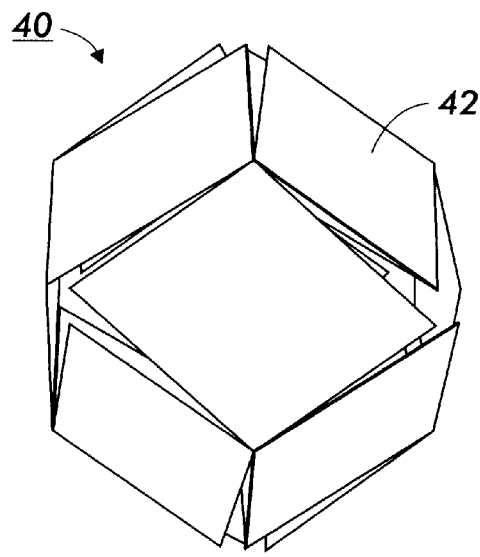
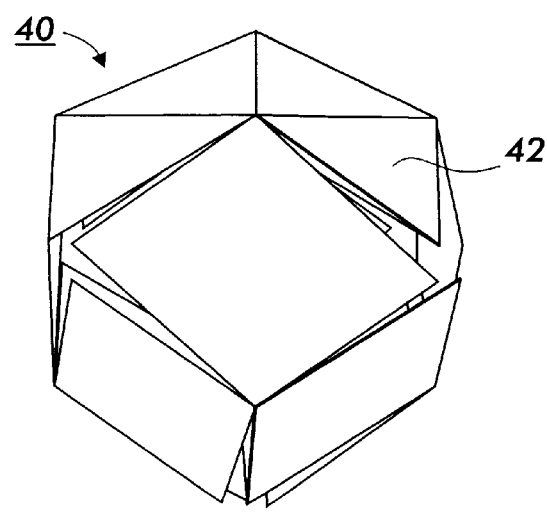
FIG. 5

FAULT TOLERANT CONNECTION SYSTEM FOR TRANSIENTLY CONNECTABLE MODULAR ELEMENTS

This work was funded in part by the Defense Advanced Research Projects Agency (DARPA), Contract #DABT630095C-025 and Contract #MDA972-98-C-0009. The U.S. Government may have certain rights in this invention.

FIELD OF THE INVENTION

The present invention relates to fault tolerant connection mechanisms for large numbers of modular elements that are not permanently connected to each other. More particularly, the present invention relates to power and data links for movable robotic module assemblies.

BACKGROUND AND SUMMARY OF THE INVENTION

The use of self movable robots to form structures has long been discussed but rarely implemented. Known as metamorphosing robots, polymorphic robots, shape changing robots, or morphable structures, in principle, such collections of modular robots can act together to build a structure or perform a given task. However, problems with construction, control, and power delivery to large numbers of robots have greatly limited use of self movable robots.

The present invention provides self movable robots having suitable construction, control, and power mechanisms to allow use of large numbers of robots in many applications. Self movable robots in accordance with the present invention can be used for locomotion over a variety of terrains (for payload delivery, or inspection, or exploration), for dynamically forming structures (bridges, walls, chairs), 3D visualization (forming arbitrary shapes), tactile displays, or even dynamic embossing (e.g. forming the print head of stamping machines). Typically, many small self movable robots (e.g. each less than 10 cubic centimeters in volume) having substantially identical construction are used. This advantageously provides robots that can be packed to fill space with minimal gaps, and allows assemblages of robots to achieve structural change by maneuvering around each other. Further, construction of large numbers of small modular robots permits more degrees of freedom than a smaller number of larger units, while also allowing for ready replacement of failed modules. Such multiple robot systems have an inherent redundancy with a large gradation of failure modes, usually providing a graceful rather than catastrophic failure of the system. Each robotic module contains a mechanism allowing for communication and transfer of power between adjacent modules, defining a robot whole to be all the modules in one connected component.

In one preferred mode, the present invention uses a rhombic dodecahedron or similar shape that is packable in a face centered cubic lattice as a guide to building a structural framework for each robotic module. The framework defines at least one of a set of vertex elements, edge elements, or face elements, that are together or separately shaped as a space filling rhombic dodecahedron. A movement mechanism mechanically moves the framework relative to other robotic modules. This may be a pivot mechanism attached to the framework to permit rotation of the framework with respect to other movable robotic modules, or other suitable mechanism for imparting translational or rotational forces to the robotic module. A power unit is connected to the movement mechanism to supply operational power for movement, and a control unit connected to the movement mechanism and the power unit to control movement of the framework. The power and control units can be externally or internally mounted with respect to each module, although internally mounted power switching units will generally be required if an external power supply is used to power the robotic modules.

In certain embodiments the framework substantially consists of vertex elements radiating from a center connection, with the pivot mechanism attached to each respective vertex of the vertex elements. Alternatively, the framework can substantially consists of edge (or face) elements joined together to substantially define a space filling rhombic dodecahedron, with the pivot mechanism attached to each respective edge (or face) of the edge elements. As will be appreciated, the movement (or pivot) mechanism can be electromechanical, piezoreactive, electrically triggered shape memory alloy based, hydraulic, pneumatic, gravitationally assisted, based on contractile polymers or retractable wires, or based on any other suitable mechanism capable of initiating translational or rotational movement of the robotic modules.

Advantageously, a rhombic dodecahedron can be stacked in dense, space filling three dimensional arrays. Each face, edge, or vertex can support electrical plates, conductors, or other suitable connectors for transferring electrical power or data between robotic modules. In certain configurations, an assemblage of robotic modules can create three dimensional voids, concavities, overhangs, or undercuts to model or present complex three dimensional structures. Such assemblages can be formed by direct guidance from an external control unit (e.g. a computer) that addresses each robotic module and provides specific movement orders to each robotic module. Alternatively, a distributed control unit defined at least in part by a plurality of individual control units in each of the plurality of robotic modules can be used alone or in conjunction with an external control unit to guide assembly.

One particularly preferred method for defining structure assembly from an assemblage of movable robotic modules, requires provision of a set of goals, constraints or guidelines for position of movable robotic modules. Each movable robotic module is required to move toward one member of the set of goals while passing information about goal state for the set of goals from each of the movable robotic modules to adjacent movable robotic modules. Such an assembly procedure causes a particular structure to be gradually built without requiring the substantial computational overhead associated with global (overall) control methods that specifically direct movement and position of each robotic module.

The foregoing system for constructing and assembling large numbers of modular robots is particularly useful in conjunction with a touchable user output interface to a computer system. Such a system can encompass a plurality of robotic modules, each robotic module substantially shaped to at least in part define a polyhedra (including space filling polyhedra such as a rhombic dodecahedron, hexagonal prisms, or cubes, or non-space filling polyhedra such as an octahedra or dodecahedron). Each robotic module is self movable with respect to adjacent robotic modules, and can include a control unit for directing assembly of a predetermined structure from the plurality of robotic modules to provide a visible and tactile output from the computer system. Each robotic module can also include a sensor for detecting user input. When used in conjunction with a detection unit for monitoring changes (in position, in pressure, in detected light, or other suitable sensable state), the plurality of robotic modules can provide input to the computer system.

For example, information from a three dimensional CAD/CAM program can be used to define a three dimensional structure capable of being dynamically constructed by assembling hundreds or thousands of robotic modules into a visual and tactile display. A user can touch areas of the three dimensional structure, and sensed movement, pressure or light changes detected by the robotic modules can be used as input to the CAD/CAM program. A user can interactively create, modify, view, or touch both the actual structure and the virtual CAD/CAM representation using such a system. In addition to using such dynamically defined structures as a computer interface for a user, the assemblage of robotic modules can be used to create molds, relief structures (including, for example, viewable terrain maps or embossing stamps), or any other suitable purpose benefiting from quick and efficient structural reconfiguration.

As important as construction and control, provision of an adequate power supply to large numbers of modules is critical to operation of the present invention. While internally mounted power supplies can be used (e.g. batteries, fuel cells, or photovoltaic), it is generally preferable to have an available external power source. Unfortunately, traditional bus based voltage power supplies are not generally suitable for powering large numbers of regularly or irregularly stacked modules, many of which are not easily connectable to a fixed bus. The known alternative, chaining modules to provide a linked power bus connectable to a voltage power supply, also does not work when large numbers of modules are used. For example, in the standard constant voltage method, current travels in parallel through each module, with each module drawing a determined load. In order for such a system to work, the resistance in the power bus through the modules must be small enough so that the modules furthest from the power supply do not see a significant drop in voltage. This reduction in resistance is typically achieved by increasing the size of the connections or wires. In addition, the power dissipated by each module is a function of the resistance squared. Unfortunately, the power dissipation for each module must be designed for the worst case; with all power running through one module. In operation, this means that the worst case module has some constant voltage (for example 5V) with the current running through it that goes through all the modules. If each module requires 100 mA, and there are 1000 modules, then the worst case module has 100A running through it. Using standard copper wire, the linked power bus through the modules would require large wires that would dominate the size and weight of the whole device. Such a constraint makes voltage power supply to large numbers of modules generally impractical for more than a few dozen linked modules.

The present invention provides a novel alternative for powering large numbers of linked modules. A plurality of modules, each module having power connection plates, includes a single dynamically defined root power connection plate, and at least one dynamically defined branch power connection plate. Each module further has a power distribution controller for dynamically defining (via mechanical, electromechanical, analog electronics, digital electronics, or software controlled digital switches) the single root power connection plate and branch power connection plates. Power is only distributed between the plurality of modules from branch power connection plates to root power connection plates of those modules connected by power connection plates. If a constant current power supply is connected to the one of the plurality of modules to provide a substantially constant current to all of the plurality of modules connected together by power connection plates, each module draws power from the bus by using some voltage drop across the module (increasing the voltage requirement from the power supply). Advantageously, each module draws the power it needs independent of any other power requirements of other modules, no matter how many modules are present in the assemblage. As will be appreciated, powering large numbers of modules in a similar manner cannot be achieved with a constant voltage supply, since the linked power bus would need to have effectively zero resistance.

The problem of determining which links must be made to provide a linked power bus suitable for implementing a constant current system can be globally addressed by a suitable external power switching control system. Any link system must act to so that each connected power supply only has a single associated power loop, and consequently supplies the same current to each module in the loop. This constraint can be difficult to determine in systems susceptible to failure or rapid power reconfiguration as additional modules are inserted, modules are removed, or modules fail.

The present invention provides for a local method for dynamically reconfiguring switched connection paths between multiple electronic modules, where each electronic module has N connections and only one current loop is formed for each attached power supply. In operation, a single root switch is determined for each electronic module (this switch can be a mechanical, electromechanical, magnetic, electrical, or even optical contact, connection plate, or other suitable switch element) with the remaining N−1 connections in each electronic module tagged as branch switches (which again can be a mechanical, electromechanical, magnetic, electrical, or even optical contact, connection plate, or other suitable switch element). A continuous switched connection path is then maintained through multiple electronic modules, with a first set of $N \geq 1$ branch switches in each electronic module connecting to the single root switch of another connected electronic module, and a second set of $N \geq 0$ branch switches being inactivated to prevent branch switch to branch switch connections between electronic modules. Such a system supports modules ordered in linear arrays, branched arrays, three dimensional arrays, loops, or even three dimensional structures having voids or cavities. Advantageously, multiple power supplies can be connected to assemblages of modules, with multiple closed electrical paths being formed to supply power to all the modules.

BRIEF DESCRIPTION OF THE DRAWINGS

FIGS. 4 and 5 illustrate flexure of certain faces in a generally rhombic dodecahedral shaped robotic module to better enable rotation of the robotic module in tightly packed assemblages;

DETAILED DESCRIPTION OF THE DRAWINGS

Figure 1:
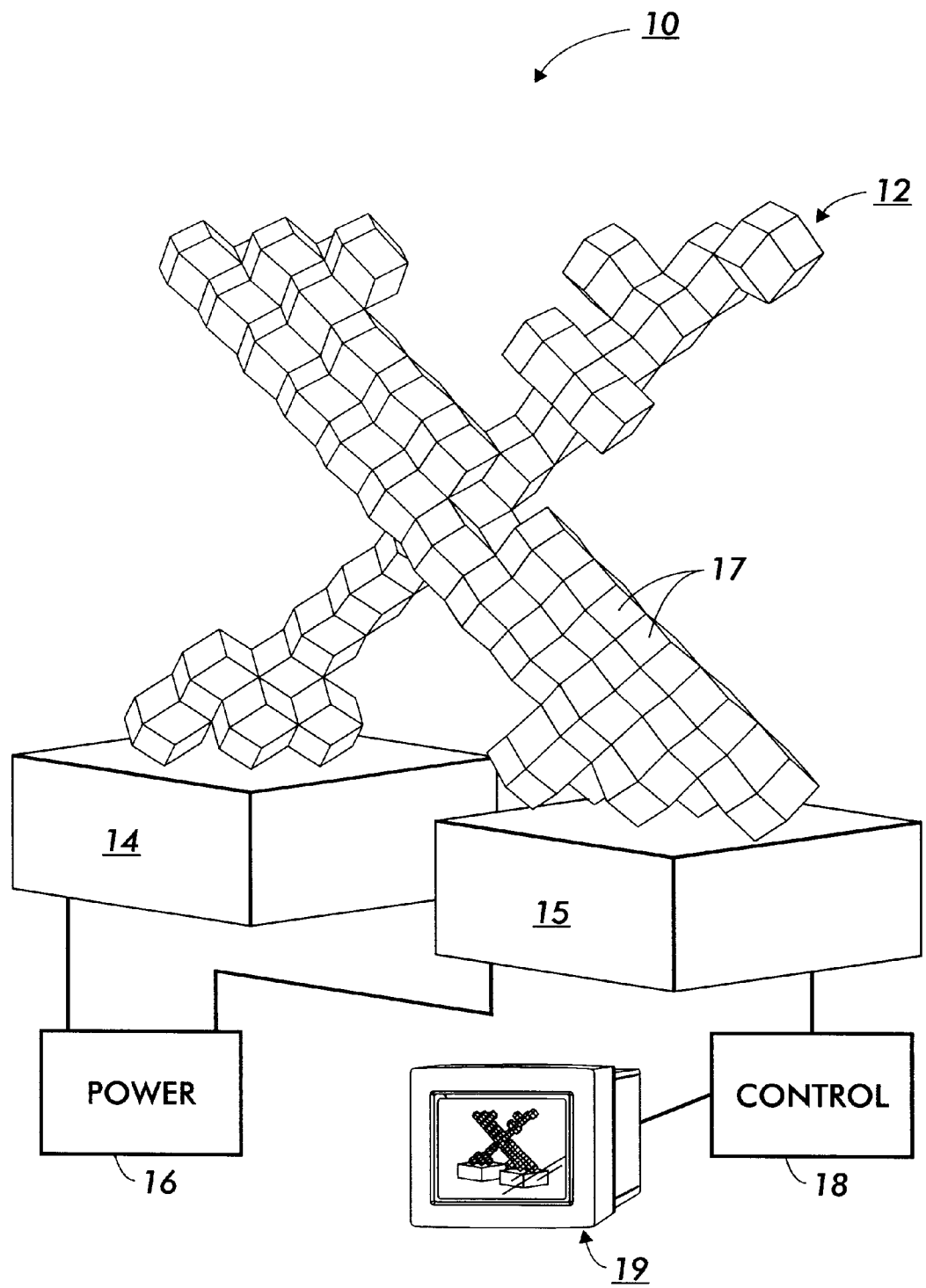
FIG. 1 schematically illustrates a three dimensional "X"-shaped structure formed by an assemblage of robotic modules, each module substantially shaped as a rhombic dodecahedron.

As seen in FIG. 1, an assemblage 10 of movable robotic modules 11 can be used to build a structure 12 substantially shaped as a three dimensional "X". The structure 12 is built on two bases 14 and 15 that are separately powered by an electrical power supply 16. The shape of the assemblage 10 can be determined with the aid of a external control module 18, with the aid of distributed control systems in each robotic module 11, or some combination of internal and external control systems. A CAD/CAM system 19 can be used to help design the assemblage 10, or alternatively, the modules 11 of the assemblage 10 can be moved by a user (or move themselves) with the resulting structure shape tracked by sensors 17 and system 19, permitting use of the assemblage for either user output or input.

Figure 2:
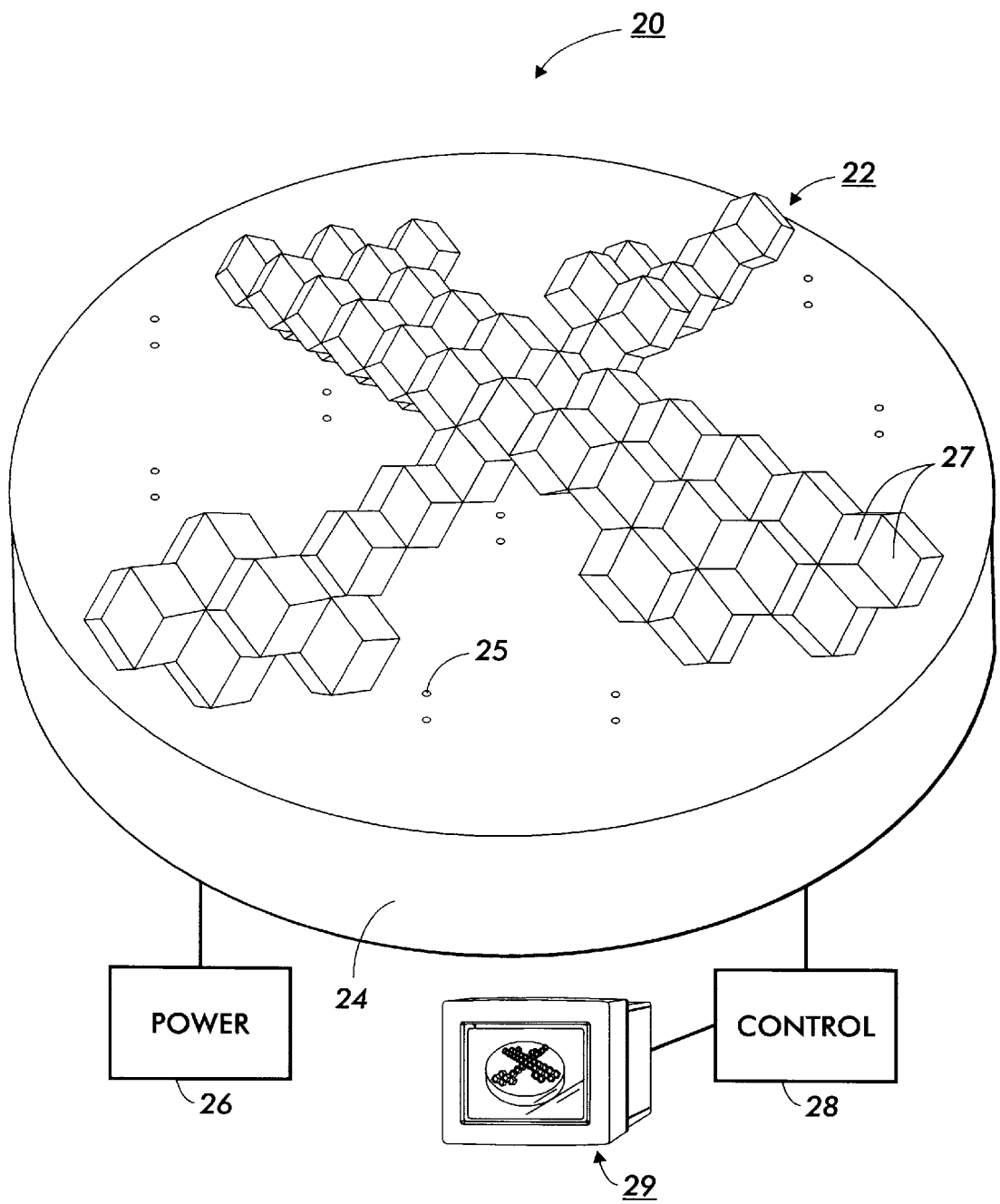
FIG. 2 schematically illustrates a substantially two dimensional array of robotic modules forming a tactile display of an "X"-shape.

Similarly, as seen in FIG. 2, raised relief assemblages 20 of modules 22 can be directably or self arranged on a base 24 having power outlets 25 (connected to power supply 26), and controlled in whole or in part by control module 28 with connected CAD/CAM system 29. Like the assemblage of FIG. 1, such a system for constructing and assembling large numbers of modular robots is particularly useful in conjunction with a touchable user output interface to a computer system (e.g. system 19 or 29). Each robotic module can also include a sensor 27 for detecting user input. When used in conjunction with a detection unit for monitoring changes (in position, in pressure, in detected light, or other suitable sensable state), the plurality of robotic modules can provide input to the computer system.

Input sensing can be based on arrays of individual compressional or tensional strain sensors, or alternatively, embedded or attached positional sensors. For certain applications, continuous sensors (e.g. bilayer sheets of capacitance sensors) may be employed. One particularly useful continuous sensor type uses multiple capacitance or resistance strips, with deformation pressure resulting in a positionally localizable analog signal proportional to the applied deformation pressure. Various sensor types can be used, including simple capacitance sensors, resistive strain sensors, analog or digital pressure switches, inductive sensors, Hall effect sensors, eddy current sensors, or even fluid flow sensors. In certain embodiments, positional or environmental sensor can be supported by robotic modules. Various sensor modes can be supported, including absolute or relative positional information as determined by gyroscopic sensors, accelerometers, or acoustic or infrared ranging techniques. Environmental sensors, including conventional light, image, thermal, electromagnetic, vibratory, or acoustic sensors can also be present. Depending on the desired application, even costly environmental or positional sensors such as those incorporating differential GPS positioning, image analysis or recognition, acoustic or voice identification, or differential thermal sensors can be used as input. As will be appreciated, the foregoing sensors can detect external events, internal events, or module transmitted events such as vibrations, forces, torques, or thermal transfer.

Sensors can be attached to conventional CISC or RISC processors internally mounted in each robotic module. For example, low power processors such as the Signetics 87c752 or 87c751, Motorola 68HC11 or 68582, or ARM 710 can be used for processing user defined touch. If convenient, coprocessors such as analog to digital converters or digital signal processors can be used alone or in conjunction with a main processor. Conventional flash, static, or dynamic RAM can used in the present invention, although for certain applications higher cost embedded DRAM may also be used. In some storage intensive applications, memory can include additional harddisk storage, either located within the robotic modules or available through an external connection to control module 18 or 28.

Figure 3:
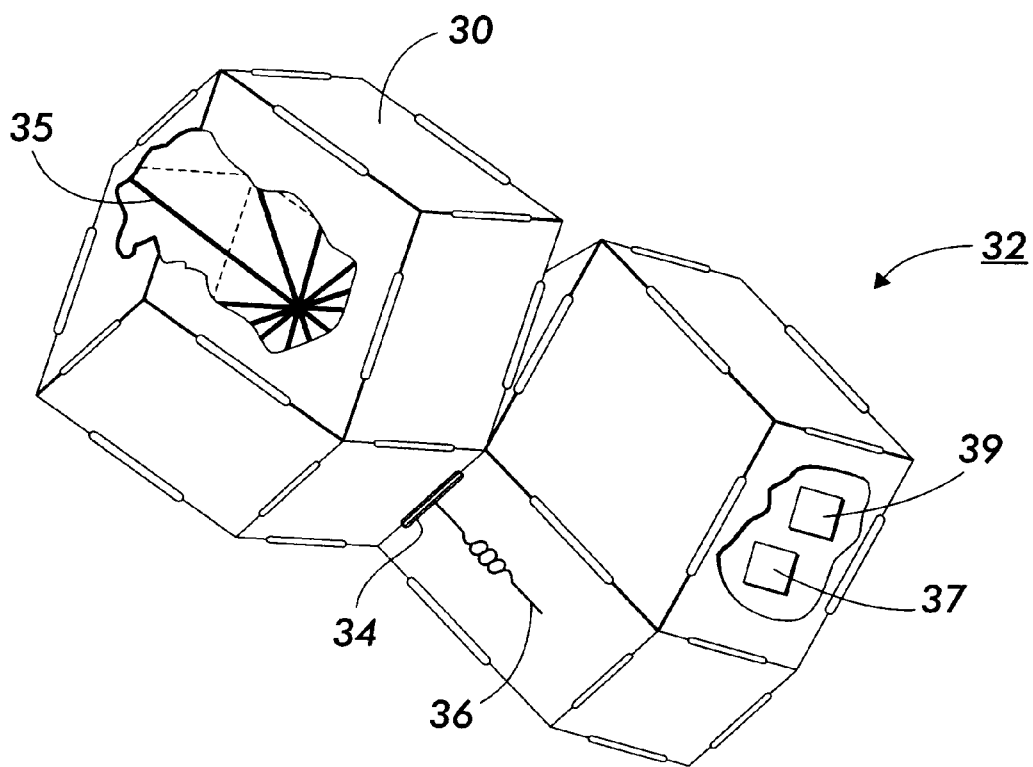
FIG. 3 is a schematic illustration of two rhombic dodecahedral shaped robotic modules rotating relative to each other about a hinge joint.

As will be appreciated, for many applications use of optional external communications can at least partially supplant use of internal processors and memory (except for that necessary to support required sensor or communication buffering and signaling). Depending on the sensor type employed, sensor data can be directly fed to the control module 18 or 28 in digital form, or be transformed to digital format by an general purpose internally mounted analog/digital converter 39 such as seen in FIG. 3 that typically provides a 4 or 8 bit range (although as few as one or as many as 32 bits may be required by various applications). As will be appreciated, combinations of sensors and sensor types can be used over the whole or part of each robotic module.

Using the foregoing sensor provided information from the assemblages 12 or 22, a three dimensional CAD/CAM program (running in conjunction with control module 18 or 28) can be used to redefine a three dimensional structure capable of being dynamically constructed by assembling hundreds or thousands of robotic modules into a visual and tactile display such as illustrated with respect to FIG. 1 or 2. A user can touch areas of the three dimensional structure, and sensed movement, pressure or light changes detected by the robotic modules can be used as input to the CAD/CAM program. A user can interactively create, modify, view, the actual structure or the virtual CAD/CAM representation using such a system. In addition to using such dynamically defined structures as a computer interface for a user, the assemblage of robotic modules can be used in an output mode to create molds, relief structures (including, for example, viewable terrain maps or embossing stamps), or any other suitable structure benefiting from quick and efficient structural reconfiguration.

In addition to the foregoing applications, robotic modules can be employed to as self-optimizing user interface (e.g. a keyboard with keys composed of robotic modules that readjust to custom configurations), as a prototyping tool for human factors engineering (e.g. quickly resizing or rearranging positions of body conformable structures such as hand grips or lumbar supports), or even for direct construction of custom sized tools, equipment, or interface elements (e.g. variable volume cup or container). Robotic modules can form the basis of multifunction tools (e.g. a flat head screw driver can be converted into a Philips head screwdrive), or can form a portion of a transport train for other systems (e.g. moving robotic modules can carry parts to desired locations, or can be linked to distribute electrical power, mechanical power, or data). In certain applications, robotic modules can be used as highly reconfigurable structural elements, permitting quick construction of trusses, supports, or tension elements to shore, for example, earthquake damaged buildings.

As will be appreciated, robotic modules 11 constituting various user definable structures can be constructed from various shapes, including spheres, ellipsoids, or regular or irregular polyhedrons. For example, the overall shape may be similar to various rectangular prisms, or can be toroidal, planar, or even be malleable enough to support a wide range of user defined irregular shapes. In addition, multiple cooperating shape elements are contemplated using conventional designs that permit interlocking of multiple shape elements (e.g. using a ball and socket, a lock and key, or sliceable or rotatable interlocked components). The shapes can be substantially rigid, or can alternatively support limited flexure or external reconfigurations. In certain applications, highly deferrable or reconfigurable modules can be used to better allow for bridging between modules, space filling, or specialized applications (e.g. internally supported structures may have length variable telescoping modules for trusses) For most applications, use of substantially identical shapes is preferred, although multiple shape designs (e.g. rectangular solids in conjunction with cubes) can be used in certain applications.

A particularly preferred shape is based on polyhedra having a shell or framework that defines at least one of a set of vertex elements, a set of edge elements, and a set of face elements, with movement of the polyhedra being accomplished by vertex, edge or face rotations using a suitable movement mechanism (e.g. a hinge or ball and socket). Vertex elements of the polyhedra alone can be defined by a radiating structure from a central attachment point, edge structures of the polyhedra can be defined as an interconnecting frame of edge supports, and face structures of the polyhedra can be defined by edge, vertex, or face attachment of plates or shells. As seen in FIG. 3, one particularly preferred polyhedra has vertex elements, edge elements, or face elements defining (alone or in combination) a framework substantially shaped as space filling rhombic dodecahedrons robotic modules 30 and 32. The framework can be internally supported (and partially defined) by vertex attached trusses 35 seen in cut away view in FIG. 3, or can alternatively be defined as edge connected face plates, or even edge elements alone. Rotational movement of polyhedra such as seen in FIG. 3 is supported by hinges 34 and actuators 36, which can include electromechanical, piezoreactive, electrically triggered shape memory alloy based, hydraulic, pneumatic, gravitationally assisted, based on contractile polymers or retractable wires, or other suitable movement mechanism.

Rhombic dodecahedra such as illustrated in FIG. 3 are space filling isohedra that, in many ways, are the three-dimensional analog of hexagons. Rhombic dodecahedra eliminate the difficulties encountered with cubic modules and simple cubic packing. Like hexagons, they require only a single simple edge hinged rotational motion for face to face movement with respect to adjacent rhombic dodecahedra, as illustrated in FIG. 3. The rotations about any edge of a rhombic dodecahedra from one packing position to another is always exactly 120 degrees. These properties are a consequence rhombic dodecahedral packing in a face-centered cubic structure. When packed, every edge is formed by the adjacency of at most three rhombic dodecahedra. When there are three rhombic dodecahedra around one edge, no motion can occur about that edge—the 360 degree space is filled. When there is one rhombic dodecahedra, no motion can occur as there must be another rhombic dodecahedron to move around. Motion can only occur when there are exactly two rhombic dodecahedra. This uniformity of the edge relationships is the key to the simplicity of the design of a mechanism that allows rotations about edges. In addition, rotations can be performed without requiring any edges or faces to slide against each other, eliminating concerns with friction and designing sliding connectors.

Generally, there here are two basic constraints for motion of a rhombic dodecahedral module in accordance with the present invention:
1. There must be a parent rhombic dodecahedra with a shared edge to roll about.
2. The motion of a module must not collide with any other module. In certain embodiments, an additional constraint is that the entire assemblage must be contiguous during and after a motion. This is a useful constraint assuming only one power source is able to supply power to all modules via electrical connection to neighboring modules.

The second constraint leads to "blocking constraints" as modules may block the motion of another module. At one extreme, if a rhombic dodecahedron is entirely surrounded by modules, that is, there are 12 neighboring rhombic dodecahedra, one on each face, then that module cannot move without colliding with one of its neighbors. At the other extreme, if there are only two modules as in FIG. 3, then the motion of one rolling over the other is not blocked by any other module. When motion planning, the question of which edge of a rhombic dodecahedron will be used and which neighboring module will block the rotation of the rhombic dodecahedra about that edge must be considered. If a neighbor attached to a face blocks the motion about an edge, that face is called a blocking face for rotations about that edge.

In practice, such questions can be addressed by constructively taking the plane formed by the edge and the center of the rhombic dodecahedron and dividing the rhombic dodecahedron into two. Five faces will lie entirely on one side, five on the other and two faces will be divided in half. The two split faces are considered blocking faces about the splitting edge. In addition, depending on the sense of the rotation, the five faces on one side are also blocking faces. This result is called the 7-side blocking constraint. Unfortunately, this constraint is generally strict if rhombic dodecahedra are used to assemble thick shapes. If six rhombic dodecahedra are brought together at a common vertex, all rhombic dodecahedra block the motion of all other rhombic dodecahedra on all contacting edges. The group is immobile—no modules can move out. Since the blocking constraint is symmetric, the converse is also the case: modules cannot move into this configuration. This configuration is encompassed within many other possible configurations, most notably any solid configuration with a minimal thickness greater than 3 rhombic dodecahedra. Therefore, the possible set of configurations that can be built by the pure rhombic dodecahedral shape is limited.

However, as will be understood by consideration of FIGS. 4 and 5, modifying the rhombic dodecahedra modules' shape slightly so that the 7-side constraint can be reduced to a 5-side constraint solves the immobility problem. Specifically, the two faces which are split by the bisecting plane would no longer be blocking faces. With the 5-side constraint, there are no configurations which are immobile. This modification requires a vertex to move about 14% closer to the center of the rhombic dodecahedron. The four edges connected to it must also move. One modification that will result in the 5-side constraint is to have the rhombic faces hinged about the short axes, and the face reduced slightly as shown in FIG. 4. When a potential collision arises, due to the 7-side vs. 5-side constraint difference, the four triangular halves of the four faces which form the interfering vertex move inward as shown in FIG. 5. Movable vertices allow the maintenance of rolling edges while removing the limiting constraints.

The use of rhombic dodecahedral or modified rhombic dodecahedral robotic modules having a similar shape has numerous advantages. One of the crucial problems for a self-assembling robot is individual module motion. For small robots, rolling/rotational motions are preferable to sliding motions because they can have less friction, which becomes very important as systems scale down in size. Additionally, since each full 120° rotation about an edge can be treated as a discrete motion, the motion constraints that determine possible configurations and movement strategies is simplified. While simplifying the mechanics of rotation, the face-centered cubic packing preserves many of the desirable features of simple cubic packing. First, when two faces of two identical rhombic dodecahedra are aligned and pressed together (mated), all rotations about one of the 4 shared edges will result in another set of faces aligning. All subsequent rotations will result in the same. While this property is also true for cubes and all regular polyhedra, it is not true for all isohedra (polygons with identical sides). As will be understood, this isohedral property also simplifies manufacture. One advantage to repeating modules is the ability to batch fabricate, minimizing the unit cost. In addition, each module can be made up of repeating parts. For example, each polyhedron is made up of faces, each face made of edges and each edge made of vertices. If the polyhedron is an isohedron with uniform edges like the rhombic dodecahedron, then batch fabrication can be applied at the face level and edge level as well.

To determine movement of individual robotic modules in an assemblage, some mechanism for global communication is generally required. This communication mechanism can be direct, by local passing of messages, or by some combination of local and direct communication. Depending on the shape of the robotic modules, the available interconnection modes, type of packing, or desired mobility, various schemes can be used for permanent, intermittent, or even one-time communication between robotic modules. For example, close packed space filling polyhedra can make use of wired connectivity between modules, or could alternatively use a variety of wireless or optical communication technologies. In the case of wired connectivity, edge, face, or vertex mounted conventional plug and socket connectors may be used for data communication . Plug and socket systems lend themselves to parallel connections for bulk and high-speed data transfer. The exact design and locations of electrical connectors depends on the intended use, and subsequently, the shape of modules. For certain applications, simple rigid connectors could be attached to the center of each face, providing connectivity to all the surrounding modules. Other applications might require a more complex design. For example, modules might employ spring-loaded contacts on the four edge connectors.

Serial connectivity can also be used in a close packed arrangement such as that illustrated in FIGS. 1 and 2. Serial connection for data transfer has the advantage that fewer connections have to be made and in practice it might be more reliable. Serial communication lends itself to optical and wireless systems thus removing the need for any physical connections. For optical technologies, alignment of the transmitter and receiver is still important although the clever use of light pipes and lens capture techniques can introduce more flexibility. Wireless systems can use many different bands of the EM spectrum (kHz, MHz, GHz), utilizing a variety of modulation techniques (amplitude modulated, frequency modulated, or those based on code division multiple access) and operate at a range of transmitter powers. There is generally no need for direct alignment if the system is designed with suitable communication tolerances. The transmitter range plays a crucial part in the design. If there is only enough power in an emitted signal to be picked up within a few millimeters of a module, then the signals will be isolated, the topology will be defined by the physical connectivity and the complexity of designing the system to avoid interference from neighboring signal sources will be minimized. However, an alternative design is to use more powerful radios. In this case all modules will be able to contact all other modules and inter-module connectivity needs to be defined by another parameter. Signal strength can be used or, more deliberately, information that relates the identification of a robotic module to a spatial map describing the position of all modules in the assemblage. For digital packet-data systems that operate at the same frequency, carrier sense multiple access (CSMA-CD or CSMA-CA) systems are well known techniques to solve this problem. Other solutions involve modules using different frequencies, with frequencies reused depending on the power of the transmitters. Yet another approach is to use Code Division Multiple Access (CDMA) that relies on the overlaying of signals in the same region of the EM spectrum, a technique known as spread spectrum modulation.

As will be understood, various conventional algorithms can be used to support distribution of information between autonomous robotic modules to support creation of desired structural outputs such as previously discussed. These systems may have a master controller (e.g. control module 18 or 28 respectively of FIGS. 1 and 2) to generate movement control data, or more distributed control schemes based in the modules can be used. The example algorithms below describe how the information can travel between modules:

Daisy Chain Routing

Modules are arranged to have a logical connectivity with each other so that each one only transmits information to the next in a predefined line. The modules are said to be daisy chained to each. Any information sent to the start of the chain contains an ID and the first module in the chain compares it to its own ID. If it matches, it acts on the data. If not, it sends the data on to the next computer in the chain until it finds its destination.

N-ary Routing

In N-ary routing the path to the destination is contained in the ID of the device. A simple routing is based on quaternary routing between physically connected modules. In quaternary routing, an array is conceptually arranged as a quaternary tree with each node having an input and three outputs. In this system each pair of bits of the ID contains a routing command. A 0 indicates send the packet to the first output, a 1 indicates the second output, a 2 indicates the third output, and 3 indicates no further transmission. There is also a count that gets decremented by each node to tell successive nodes the bit number that is currently being considered and when the packet has reached its destination. In this way packets are forwarded from node to node with a simple choice at each stage until they reach their target module. As will be appreciated, it is possible to design N-ary systems with more than three outputs (a power of two is usually convenient for implementation (e.g. 4, 8, 16 . . . ).

Flooding

Flooding (i.e. breadth first traversal) has no predefined routing structure. The control module takes a first packet from a source module and checks to see if it has the correct ID for each module. If not, the packet is sent out on all directly linked modules to which it has not yet sent or received that packet. The result is a flood of copies of the packet across the module array, with a correct packet eventually reaching its destination. The packets must also have a maximum hop count to ensure they eventually are removed from the system. The disadvantage of this approach is that many more modules are burdened with the processing of unwanted data than in the previous two schemes, which may impact the overall efficiency of the system.

Hot Potato

The Hot Potato algorithm is similar to the Flooding algorithm, except a retransmitted packet is sent out on only one output that is either chosen randomly or is the least busy. The process stops when the packet reaches the correct module. The time that a packet takes to reach its destination is not deterministic.

Figure 6:
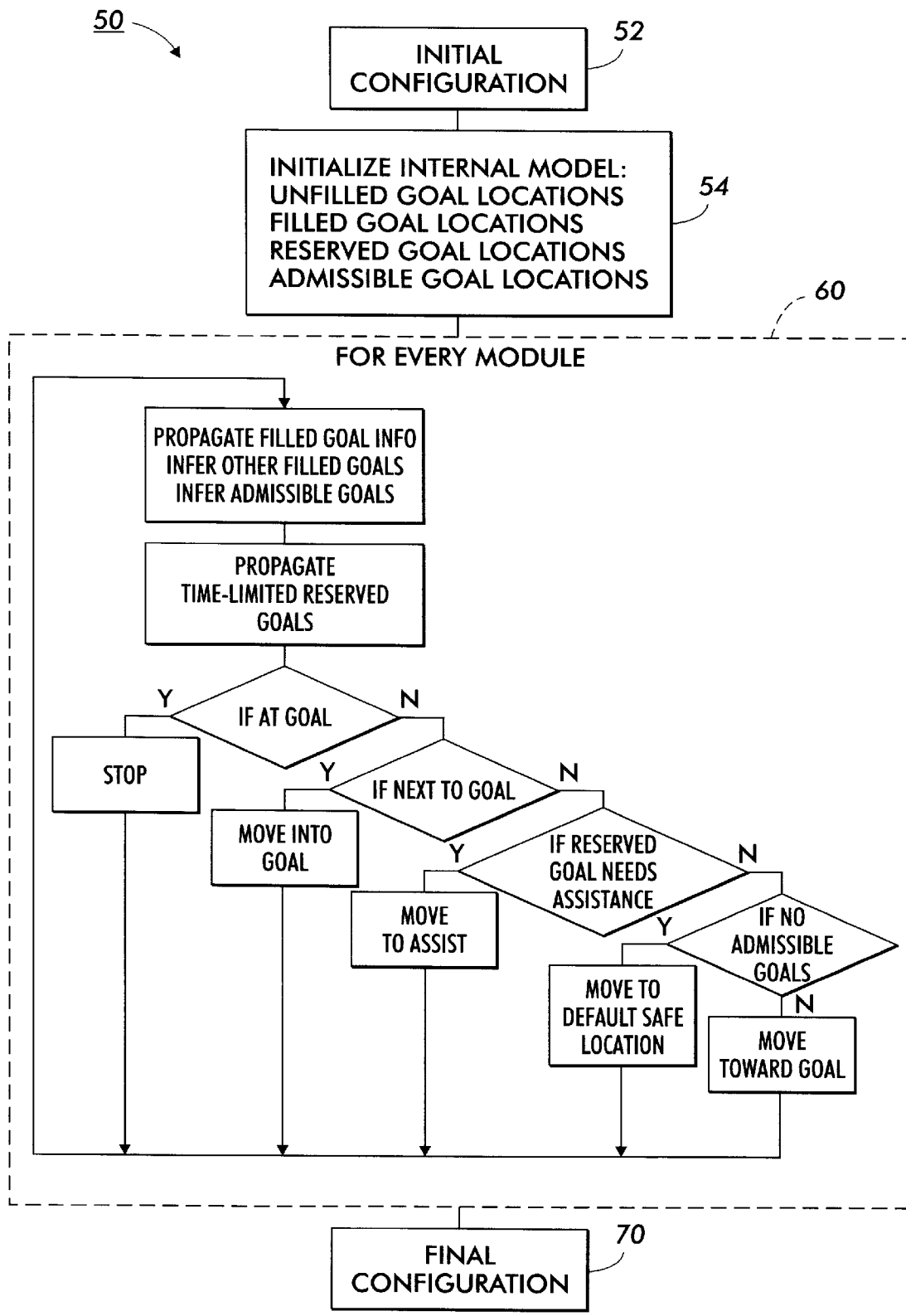
FIG. 6 illustrates a partially distributed control scheme for large assemblages of robotic modules.

In addition to module shape, module movement, and data distribution between modules, an important aspect of the present invention is the configuration planning for modules. This is best seen in reference to FIG. 6, which illustrates one possible embodiment of a process 50 for translating an initial configuration 52 of robotic modules (such as previously discussed) into a final configuration 70. Movement of each module in an assemblage is iteratively determined as noted with respect to box 60 and the following description of an ordered nearest goal robotic module movement method:

In this method, each module moves toward the closest available goal while receiving information from adjacent modules about the status of that goal. Certain constraints are placed on the order in which goals are filled. These constraints can be determined by the individual modules as a function of the goal locations. Each module chooses a movement direction based on an Euclidean distance heuristic, but places higher preference on locations with two or more neighbors. The information communicated per time step is independent of the number of modules.

Information Storage and Propagation

Each module starts with a representation of all the goal locations and its current location. It adds to information about the current state of each goal, such as whether it knows the goal to be filled. Each module also dynamically stores its own state; the number and location of its current neighbors. Information propagation is limited to information important to a module by limiting it to queries about a neighbor's state information. Examples include asking for information about a specific goal, or asking about a neighbor's neighbors.

Goal Ordering Constraint

To ensure that all goals are able to be filled, the algorithm constrains the order in which goals are filled. The basic idea is to sweep a plane across the target configuration, filling goal locations as the plane moves past; actually, some regions get somewhat ahead of others. Each module only needs to know the preferred direction of the plane.

First define a coordinate system on the modules. For face-centered cubic packing, the modules can be centered on a 3D checkerboard grid: defined to be every integer location on a 3 dimensional grid for which the sum of the coordinates x, y, and z is even.

For any goal location G, define:

$$H(G)=y+z,$$

where y and z are the y- and z-coordinates of G. This function defines the direction of the plane.

Define two locations to be vertex-adjacent if they share at least one vertex. Then, G is goal-constrained if, for some vertex-adjacent goal N of G, N is unfilled and $H(N)<H(G)$. In other words, goals near G with lower H-values must be filled first. G is admissible if it is not goal-constrained.

The reason vertex-adjacent is used here instead of just face-adjacent (sharing a face) is that it is possible that interference may occur between two modules that are vertex-adjacent and not face adjacent.

Note that under this constraint, at most 7 neighbors of G are filled before G is filled. This result corresponds to the physical constraint, where a module at G can have up to 7 neighbors and still be free to move using the 5-side constraint discussed previously.

Reservation Constraint

A module at location L and moving toward goal G can reserve a goal if: L is adjacent to G and $$H(L)>H(G)$$

If a module satisfies these two criteria, it records the time that it reserved the goal. The module then keeps this reservation for 100 turns, or until it communicates with a neighbor that reserved the same goal at an earlier time; after it moves adjacent, it queries it and communicates this state. If any of its neighbors is moving towards the same goal, the neighbor records that the goal has been reserved and is forced to choose a different goal. This reservation information is then propagated from these neighbors to other modules moving toward this goal. By forcing other modules to choose other goals, the module making the reservation should have more room to move and be able to fill its goal.

Assistance

A goal G will generally have a neighboring goal P such that $H(P)<H(G)$. Under the ordering constraint, P will be filled before G, so that when a module reserves G, the module uses P as its parent, rolling over P to reach G. In the case where such a parent P does not exist, one of two actions occurs. If G must be filled before all of its neighboring goals under the ordering constraint, then G cannot be reserved. Otherwise, when a module reserves G, it raises an assistance-required flag. If a neighboring module is also moving toward G, then instead of choosing another goal, it assists the reserving module by moving to a neighboring location L satisfying $H(L)<H(G)$. The reserving module can lower the assistance-required flag and roll over the assistant to reach its goal.

Decision Making

Based on what a module knows about the various goals, it can choose the closest unconstrained goal and begin moving toward it. When a module reaches its desired goal location, it stops moving. This ensures that the admissibility of goals is never overestimated, i.e. a module may consider a goal to be constrained when it is not, but the reverse never occurs. This also ensures that once a goal is admissible, it will never become inadmissible. Information about the filling of goals is also never overestimated.

Sometimes, a module will have no goals to move toward, because all the admissible goals are either filled or reserved. It then moves towards a default goal D, for example which can be calculated from the goal configuration by:

$$D=M+(0,4,4)$$

where M is the goal location with maximum H(M) and the ordered triplet corresponds to the (x,y,z) coordinates.

Note that for all goals G, H(D)≧H(G)+8. This helps to relieve overcrowding situations by allowing modules with nowhere to go to move away so that the goals can be filled by the modules which reserved them.

At each location, modules choose a direction to move toward the goal by querying about a neighbors' neighbors to determine all possible neighboring reachable locations that it can move to. It then ranks these locations by the following criterion:

1. a location is the desired goal; highest priority
2. a location has at least one filled goal as neighbor; medium priority
3. a location has at least two neighboring modules; low priority Euclidean distance is used as a secondary criterion, with locations closest to the desired goal favored over other locations. Ties are broken randomly. The modules tend to stay together rather than spread out in long chains toward goals due to the second and third criteria. The lack of long chains results in a significant decrease in the number of local minima for the Euclidean distance heuristic. To escape from the few local minima that do occur, modules use simulated annealing, where they occasionally disregard the priority rules and choose a less favorable location.

Complexity Analysis

Information propagation is limited to only the information most important to the module. A module can only query its neighbors about the following:

1. Has my goal been filled already?
2. Has another module reserved my goal?
3. Do you need assistance? Are you assisting me?
4. Are you filling a goal that I did not know was filled?

If a module discovers any information from these queries, it records the discovery in its own set of state information. This process allows information to be gradually propagated to all the modules. If a module discovers that a particular goal G is being filled using query (4), it can also determine under the ordering constraints which other goals must have been filled before allowing G to be admissible.

The entire algorithm is processed in time steps. A time step is defined to be the time a module spends doing one or more of the following:

Choosing among what goals it thinks are admissible

Querying neighboring modules

Rolling around a neighboring module.

The following complexity analysis uses this definition of time step. Since information is severely limited, and the movement heuristic is very low-cost, the time complexity, per module follows:

Information communication: O(1) per time step

Computation time: O(g) where g is the number of goals

Memory requirement: O(g)

In the current implementation, the worst case computation time is due to periodically searching for the closest goal. With a precomputation scheme it is expected that this should reduce to O(log(g)) or O(1) with perhaps a modest increase in the information communication and/or the memory requirement.

These calculations assume a hardware solution for determining whether the continuity motion constraint will be broken, for which no efficient software solution has yet been found.

Algorithm Verification

The ordered nearest goal planner was simulated for several test cases. These test cases start in initially square configurations of varying size, with goal configurations of varying complexity, including: a planar "X" with 54 rhombic dodecahedra (similar to that schematically illustrated with respect to FIG. 2), a tea cup with 441 rhombic dodecahedra and a hollow sphere with 625 rhombic dodecahedra. Assembly from a square planar shape to a teacup shape took 1808 time-steps to complete inside a 64×64×64 workspace grid. For some shapes 100% completion was not reached. The hollow sphere would sometimes end with rhombic dodecahedra trapped on the inside unable to reach locations on the outside. This situation varied depending on the thickness of the sphere wall. Successful completion of a hollow sphere with 625 rhombic dodecahedra takes about 3442 time-steps.

Provision of an adequate power supply to large numbers of modules requires determining which intermodular links must be made to provide a linked power bus. A suitable mechanism is seen with respect to FIG. 7, which schematically illustrates a three module system 80 (modules 86, 87, and 88) that can simultaneously carry power from a constant current power supply 82, and data through suitable signal modification of the power by optional signal module 84. Advantageously, the constant current system 80 does not require global addressing by a suitable external power switching control system. Instead, each module 86, 87, and 88 can locally control power switching (with switches 90, 91, and 92 acting through module electrical contacts 93, 94, 95, 96, 97, 98, and 99), consequently improving fault redundancy of the system and ensuring rapid power reconfiguration as additional modules are inserted, modules are removed, or modules fail.

Figure 7:
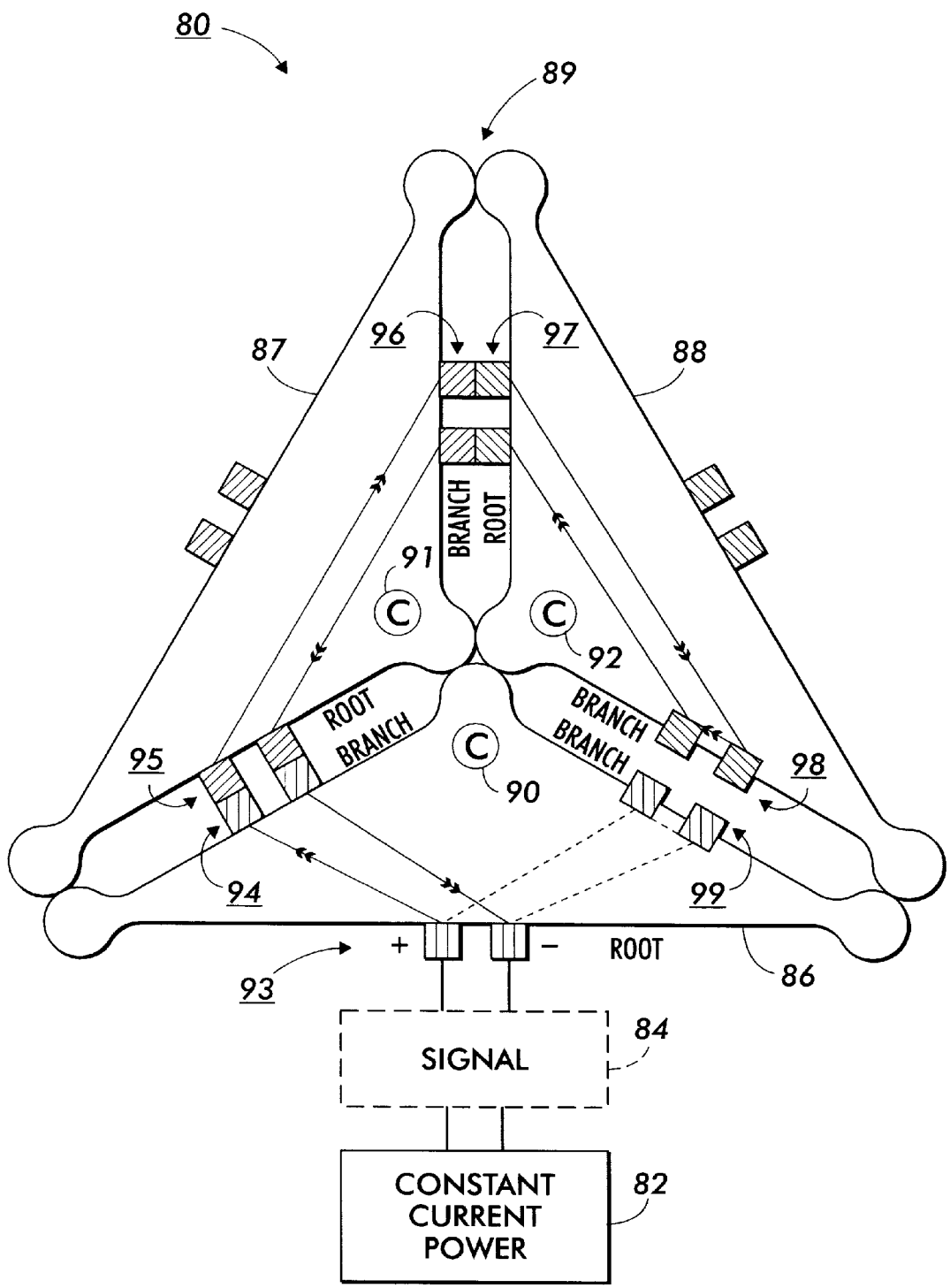
FIG. 7 illustrates dynamically switched constant current power transfer to three connected modules.

As seen with respect to FIG. 7, the present invention provides for a local method for dynamically reconfiguring switched connection paths between multiple electronic modules, where each electronic module has N connections (in this case three (3) possible connections per module). Such switched connection paths can be used for transfer of power, of data, of power and data, or any other suitable resources (e.g. fluid or particulate transfers between modules). In certain applications such as daisy chain routing, dynamically reconfigurable connection paths in accordance with the present invention are even required.

In operation, a single root switch is determined for each electronic module, with the remaining N−1 connections in each electronic module tagged as branch switches. A continuous switched connection path is then maintained through multiple electronic modules, with a first set of N≧1 branch switches in each electronic module connecting to the single root switch of another connected electronic module, and a second set of N≧0 branch switches being inactivated to prevent branch switch to branch switch connections between electronic modules. Such a system supports modules ordered in linear arrays, branched arrays, three dimensional arrays, loops, or even three dimensional structures having voids or cavities.

As an example of operation of the foregoing method, consider the power transfer path (arrowed lines) for the modules 86, 87, and 88 in FIG. 7. When power is supplied to module 86, the switch 90 determines that contact 93 is a root contact for module 86, with the remaining contacts 94 and 99 module tagged as branch contacts. Similarly, when power is supplied to module 87 from module 86, the switch 90 determines that contact 93 is a root contact for module 86, contact 95 is defined as a root contact, and contact 96 is tagged as branch contacts. This pattern continues with module 88, where contact 97 is determined to be a root contact and contact 98 is determined to be a branch contact.

A continuous switched connection path is then maintained through modules 86, 87, and 88, with the branch contacts 98 and 99 being inactivated through electromechanical retraction of the contacts to prevent branch to branch connections between electronic modules.

Figure 8:
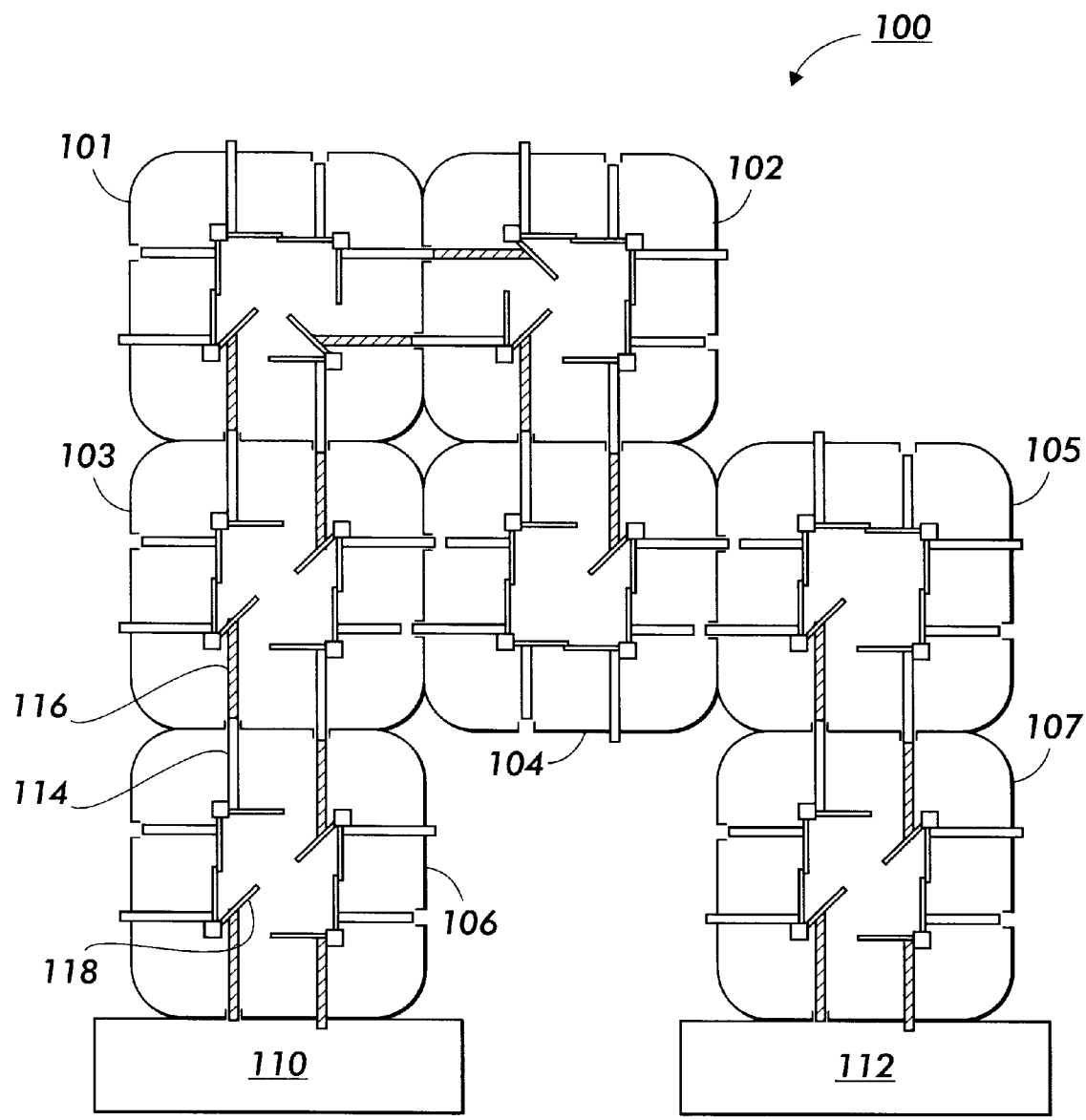
FIG. 8 illustrates electrically switched connection from two separate sources to an assemblage of modules.
Figure 9:
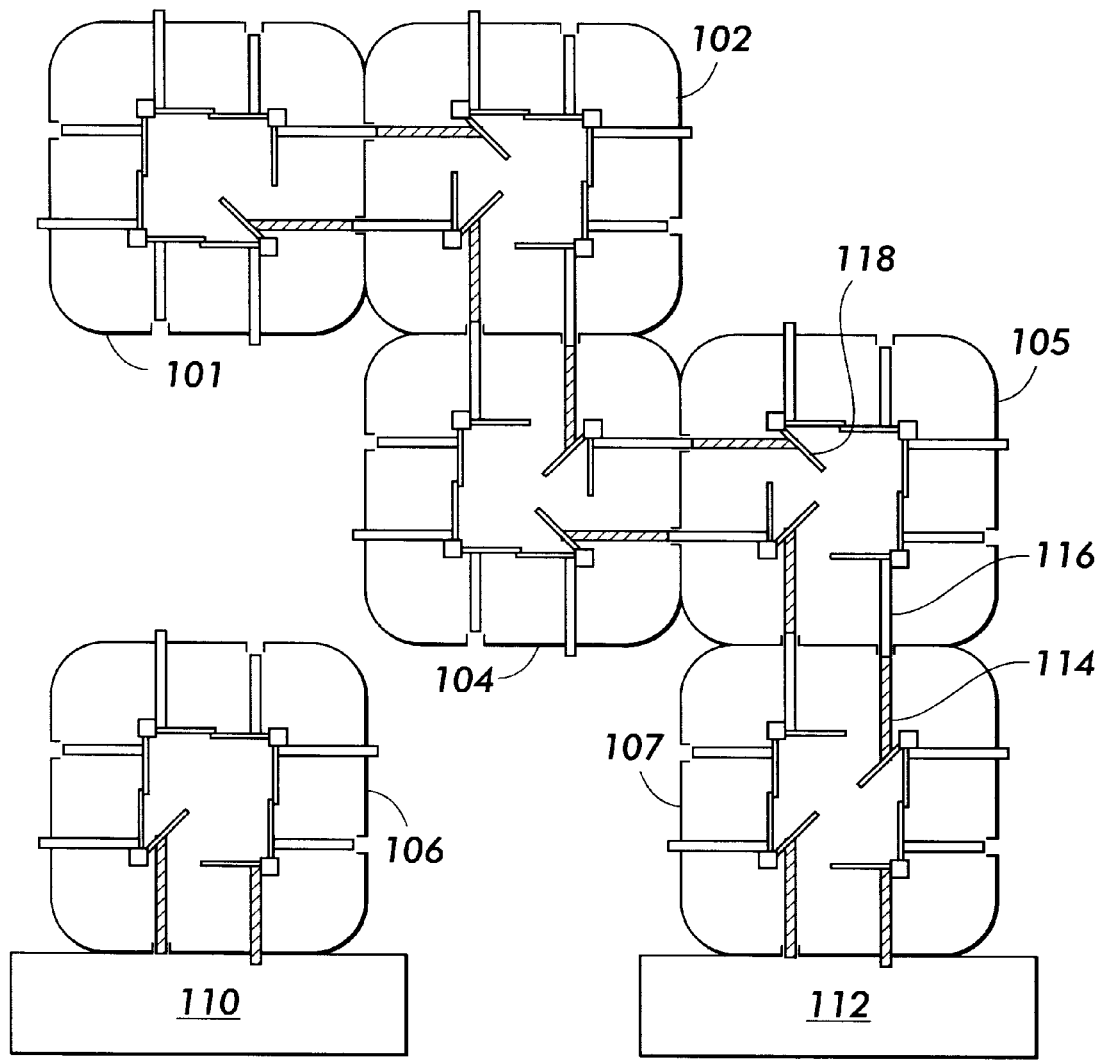
FIG. 9 illustrates dynamic reconfiguration of switched connections to prevent connection failure in the module assemblage of FIG. 8 after removal of a module.

As seen with respect to FIGS. 8 and 9, dynamically reconfiguring power through local switching in accordance with the present invention advantageously allows multiple power supplies to be connected to assemblages of modules, with multiple closed electrical paths being formed to supply power to all the modules. As seen in FIG. 8, module 106 and 107 are respectively powered from a base plate 110 and 112. Since each module in module assemblage 100 can have only one root, and the system has two power sources (base plate 110 and 112), the system has two current loops: the first through modules 106-103-101-102-104 and the second through modules 107-105. Note that even though modules 103 and 104 are facing each other, they are not electrically connected (with the contacts being physically separated under local switching control) since the facing contacts are both branches. In practice, once a contact is defined as a branch, it is pulled back to prevent branch to branch electrical contact, while still allowing root to branch contacts. Similarly, facing modules 104 and 105 also present branch to branch contacts, so again electrical contact is not made and the separate current loops from base plate 110 and 112 are preserved.

As seen in FIG. 9, when a module 103 is removed from the assemblage 100 of FIG. 8, the system locally and dynamically reconstructs the power path. When modules lose power, the contacts move to their default state with root contacts extending. The powered contact of modules 106 and 107 get labeled as root contacts, while the others contacts retract into the branch state, permitting continuation of power to each module.

Figure 10:
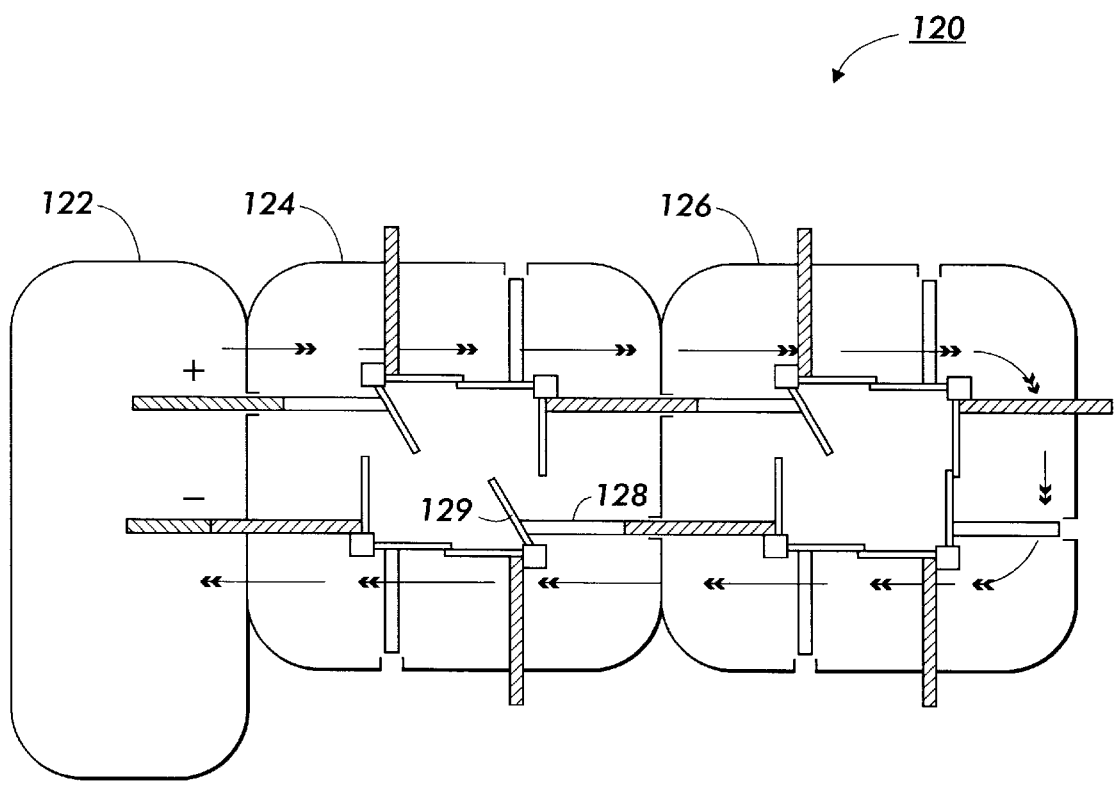
FIG. 10 illustrates one embodiment of a mechanical switching circuit suitable for modules arranged in linear or branching linear structures without loops, FIG. 11 illustrate an electrical switching system suitable for modules arbitrarily arranged.

An alternative way to implement at least some of the foregoing described switching behavior in connected modules is illustrated with respect to FIG. 10. As seen in FIG. 10 a purely mechanical switch connectable to a power supply 122 can be used to connect power switched modules 124 and 126 in linear, branching linear, or otherwise non-looping patterns. As seen in FIG. 10, each connection plate has both one positive lead 128 sticking out and a negative, non-extendable female lead. When two connection plates are attached (e.g. between modules 124 and 126), the longer lead 128 makes contact with the negative lead and at the same time pushes open the switch 129 on the other module, preventing multiple power loops.

Figure 11:
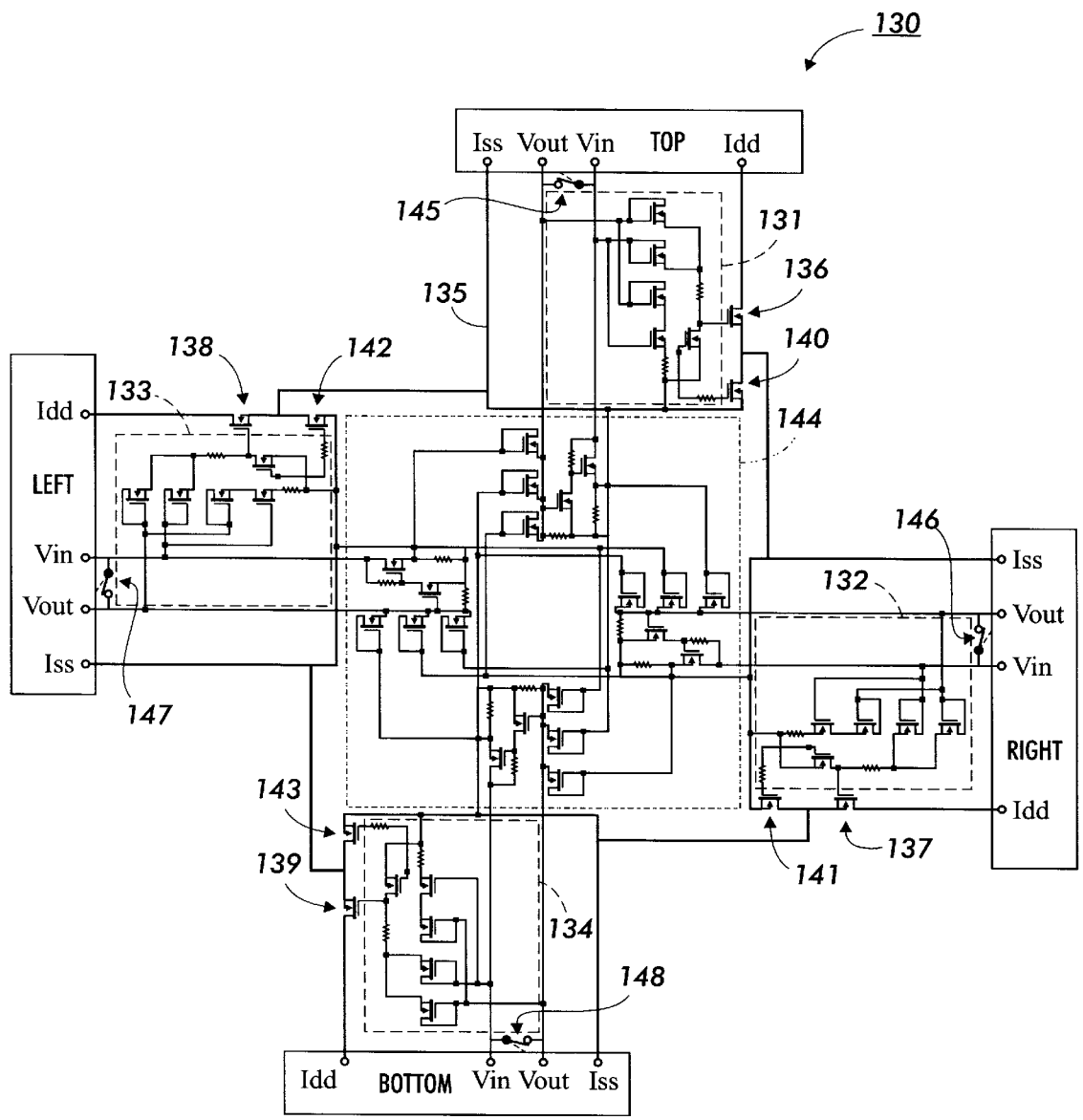

Because of the absence of failure prone moving parts, it is generally best to minimize the number of moving parts. As seen with respect to FIG. 11, an NMOS (enhancement mode) embodiment having few moving parts may be used inside a repeated module to automatically route power to from one continuous circuit loop through many attached modules (not shown). FIG. 11 shows four module connection plates with four connectors in each Idd, Iss, Vout and Vin. As those skilled in the art can appreciate, the design can easily be modified for varying numbers of connection plates. The connectors labeled Idd and Iss form the connection for the constant current line. The connectors labeled Vout and Vin correspond to a second low current, higher voltage line whose purpose is to provide voltages high enough to switch the MOSFETs. When a module is attached to a power source, a constant current source is attached to Idd and Iss, and at substantially the same time a voltage is applied to Vin, by the physical attaching of the electrical connectors. The voltage on Vin is high enough to turn on the MOSFETs used (e.g. 10V) relative to the higher the voltage level on Idd. Idd is the high side of the supply. The resistors shown have values high enough so that the current through the lower current bus stays low relative to the current in the high current bus.

In addition to the MOSFETs physical switches 145, 146, 147 and 148 are normally closed, and opened by the presence of a mating connection plate. On each connection plate, the switches can be magnetically opened reed switches, opto-interrupters, or a physical contact that is physically opened by the action of mating two modules.

When modules attach on the connection plates, the Idd of one connection plate connects to the Iss of the attached module's connection plate and vice versa; similarly for the Vout and Vin. While Iss and Idd supply the routing for the power current, Vout and Vin propagate higher voltages to switch the routing as well as allow a method to determine which connection plate should be the root plate.

The constant current line is shown in bold in the figure. Note that MOSFETS 139-143 are in line with the circuit loop and can thus connect or disconnect the Idd and Iss lines in a daisy chain fashion from connection plate to connection plate. MOSFETs 140, 141, 142, 143 are used to make or break the connection between Idd and Iss on the same plate. If no module is present on a connection plate, then the Idd and Iss line on that connection plate need to be shorted together in order to maintain continuity. If a module is present, then Idd and Iss on that connection plate must not be shorted together so that all the current will flow through Idd and Iss to the neighboring module. We call these MOSFETs terminating MOSFETs since they act to terminate that branch of the module. MOSFETs 136, 137, 138, and 139 are used to make or break the Idd line to a neighboring module. If an unpowered module (or root connection plate) is present on a connection plate, then the corresponding MOSFET must be ON to allow current to flow through Idd to power that module. If the neighboring module is already powered (a branch connection plate) and the given connection plate is also powered (a branch connection plate), then current must not flow so the Idd is opened via the corresponding MOSFET 136, 137, 138 or 139. We call these MOSFETs passing MOSFETs since they act to pass or not pass the power to a neighboring module.

Each connection plate has a terminating MOSFET and a passing MOSFET associated with it. The five MOSFETs grouped together in 131 and identically-in 132, 133, and 134 are used to switch the termination and passing MOSFETs and are also associated with a given connection plate. They set the termination and passing MOSFETs depending on the voltage levels on Vout and Vin.

| Vout | Vin | Termination switch | Passing switch | Comment |
|------|------|-----|-----|-----|
| High | High | On  | Off | Loop detected, or not mated |
| High | Low  | Off | On  | Local receiving power |
| Low  | High | Off | On  | Local sourcing power |
| Low  | Low  | Off | Off | Should never occur |

The MOSFETs 144, grouped together in the center of the figure are used to set the Vout voltages of all the connection plates. The MOSFETs 144 function is to set the Vout whose associated Vin first receives a high voltage to be low and all other Vout's to be high; and to maintain those voltages until the first Vin loses its high state. In other words, the first powered connection plate to be powered is labeled the root and maintains that status until that connection plate loses power (is disconnected).

A typical scenario that illustrates the functions of the components above would be the initial powering of a module (the first connection plate receiving power), a module is added to the given one (supplying power to another module), and finally a loop is detected, (a powered module is connected). For the purposes of understanding the circuit functions, it may be convenient to consider the high current line (the bolded lines) to be ground. If the given module is attached to a powered system via the top connection plate, then Idd and Iss will be attached to the constant current bus—establishing a "ground" reference voltage.

Switch 145 is opened by the presence of the mating connection plate. Vin on the top connector will receive a signal high (e.g. 10V). 10V will be propagated through the MOSFETS in 144 to the bottom, right, and left Vout.

Corresponding bottom, right and left Vin will receive high voltages through switches 146, 147, 148.

On the top connector, Vout will be low, Vin will be high which will set the terminating MOSFET 140 off and the passing MOSFET 136 on.

The other terminating MOSFETs 141, 142, 143 will be on and passing MOSFETs 137, 138, 139 off. Thus current will flow from Idd on the top connection plate, around the other three terminating MOSFETS and out through Iss on the top connection plate, something visually like a cul-de-sac.

At this point if a new module is attached to the right connection, for example, the new module's Vin will see the 10V from the right connection plate's Vout. Thus, the switching level voltages are passed from module to module. The switch 146 will open by the presence of the new module. Vin on the right connection plate will float low so the terminating MOSFET 141 will switch off and the passing MOSFET 137 will switch on and current will flow through the new module.

If the new module was already powered, then as the switch 146 opens, Vin will not float low since it will be driven high by Vout on the other powered module.

There are many alternatives to a separate higher voltage switching bus. Switching level voltages can be generated on each module individually. This can be done be extracting energy from the high current line either photo-voltaically, switching DC-DC converters, self-oscillating transformers etc. Another method for labeling root (other than voltage levels on Vin and Vout) is to use light as a label. For example, instead of a high voltage level on Vout signifying a branch connection, an LED that is on can do the same thing with a photo-sensitive device (such as a photo-diode, photo-transistor, CdS cell, photo-voltaic cell etc) can detect the labeling. If a photo-voltaic cell is used, then the energy may even be used to generate the higher switching level voltages.

Figure 12:
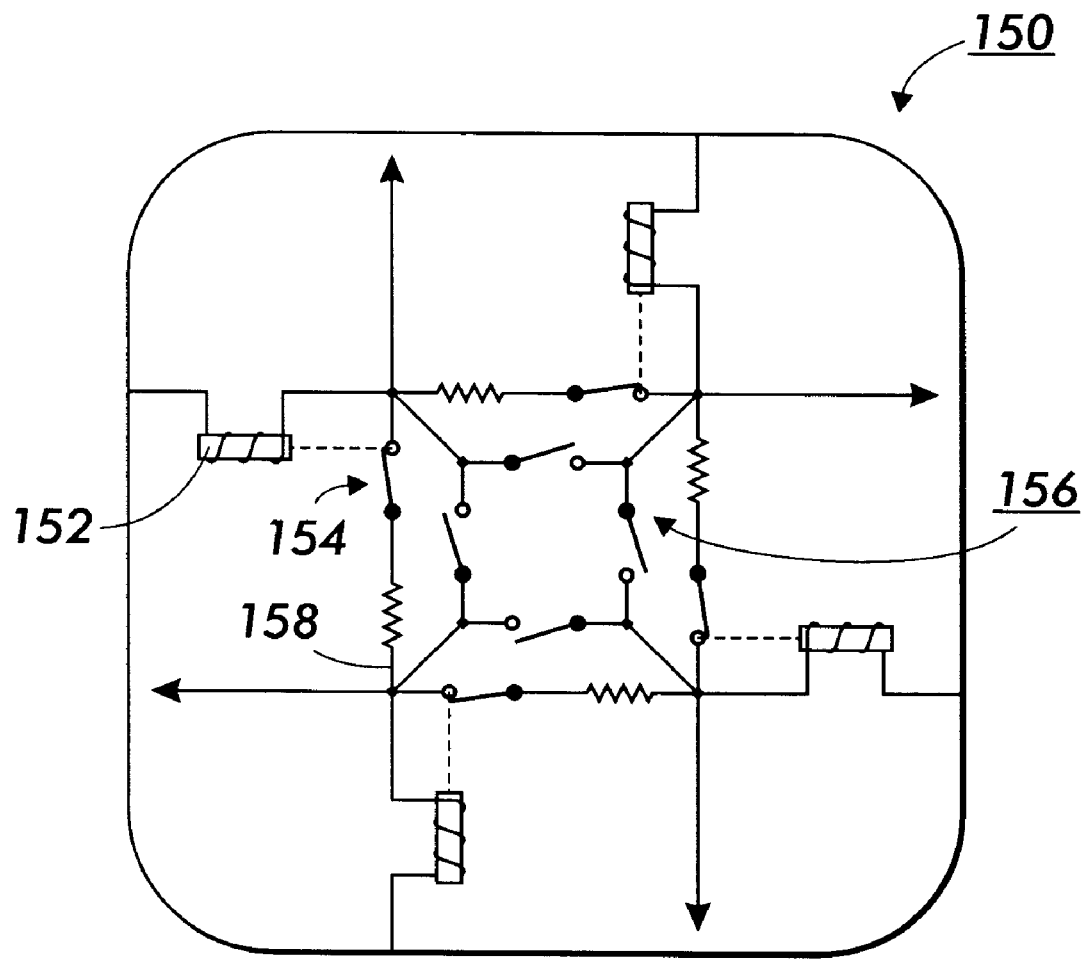
FIG. 12 illustrates a robust, fault tolerant switching circuit.

To enhance robustness of switches in accordance with the present invention, one must recognize failure modes where a module does not make a connection when required from repositioning or through some module component failure. In one embodiment of the present invention, robustness of power connections in a switching circuit 150 for a module is enhanced by use of relays 154 as shown in FIG. 12. Here, relays 154 are normally closed with the inductive coils 152 used to open the switch. The resistors 158 have the same resistance as the relay coils. Ideally, this resistance is small to reduce power losses. The set of four switches on the most internal square 156 operate passively so that if two modules (with the second module switching circuit being similar to the illustrated switch) are mated and current is flowing between them, some of that current (about ⅓) will flow through the relay and open the redundant parallel switch. In effect, the connection functions as a make-before-break switch, breaking only if current is actually flowing. So, if a module connects and has a faulty switch, or has a broken wire somewhere internally, current won't flow, the relays 154 won't trip and a circuit for an entire module assemblage will be maintained. If the circuit is somehow broken after it is already established, all the relays in the whole system will close and the power path will reestablish itself as the relays open except for the module that is faulty. Alternatively, substantially the same functionality can be implemented by providing a mechanism for sensing current in the relay coil path. For example, Hall effect sensors can be used to measure changes in the magnetic field. This sensor would drive a power MOSFET to open a switch. Optical methods (turning on lamps, or LED's with the current and detecting that light) may also be used for some applications.

As will be understood, use of the foregoing described module switches to locally and automatically control power loop removal in the power path generally increases robustness of modular systems. In some modular systems for example, the modules are arranged in a highly parallel structure, such as may exist with a 3 dimensional stack of cubes 3 cubes deep (27 cubes) with each of the 6 faces being a power connection plate. There are hundreds of different combinations potentially available to form different non-looping power and data paths. If any of the modules fail to pass power or data, the other modules will automatically remake one of the other connections. For better robustness, it is best if logic level voltages are generated from local power lines rather than a separate higher voltage low current bus. So, if the power line is not functioning within one module, its logic levels won't be generated which the system will detect and thus remove the module (in an electrical sense) from the circuit. In the case where multiple power sources are available, the system can adapt to use them as needed.

As those skilled in the art will appreciate, other various modifications, extensions, and changes to the foregoing disclosed embodiments of the present invention are contemplated to be within the scope and spirit of the invention as defined in the following claims.

What is claimed is:

1. A method for dynamically reconfiguring switched connection paths between multiple electronic modules, each electronic module having N connections, the method comprising the steps of:

determining a single root switch for each electronic module, with a remaining N−1 connections in each electronic module tagged as branch switches, and maintaining a continuous switched connection path through multiple electronic modules, with a first set of N≧1 branch switches in each electronic module connecting to the single root switch of another connected electronic module, and a second set of N≧0 branch switches being inactivated to prevent branch switch to branch switch connections between electronic modules.

2. The method of claim 1, further comprising the step of arranging the multiple electronic modules in a two dimensional array.

3. The method of claim 1, further comprising the step of arranging the multiple electronic modules in a three dimensional array.

4. The method of claim 1, further comprising the step of defining the electronic modules as space filling polyhedra to permit space filling packing of the electronic modules.

5. The method of claim 1, further comprising the step of transferring electrical power between the electronic modules through the switched connection path.

6. The method of claim 1, further comprising the step of transferring data between the electronic modules through the switched connection path.

7. A method for dynamically reconfiguring switched connection paths between self movable robotic modules, each self movable robotic module having N connections, the method comprising the steps of:
   determining a single root switch for each robotic module, with a remaining N−1 connections in each robotic module tagged as branch switches,
   moving a robotic module from a first connection site to a second connection site, and
   remapping the switched connection path to maintain a continuous switched connection path through multiple robotic modules, with a first set of N≧1 branch switches connecting to the single root switch of each connected electronic module, and a second set of N≧0 branch switches being inactivated to prevent branch switch to branch switch connections between robotic modules.

8. An apparatus for dynamically reconfiguring switched connection paths between multiple electronic modules, each electronic module having N connections, the apparatus comprising:
   a determinable root switch for each electronic module, with other N−1 connections in each electronic module tagged as branch switches, and
   a switched power path maintaining a continuous switched connection between a tagged branch switch and a root switch of another connected electronic module, and preventing connection between other tagged N−1 branch switchs and branch switches of other connected electronic modules.

9. The apparatus of claim 8, wherein the determinable root switch is mechanically defined.

10. The apparatus of claim 8, wherein the determinable root switch is electrically defined.

* * * * *